United States Patent
Michel et al.

(10) Patent No.: US 6,336,397 B1
(45) Date of Patent: Jan. 8, 2002

(54) FOOD PREPARATION APPARATUS FOR STREET VENDORS

(76) Inventors: Michael Piaget Michel; Angel R. Michel, both of 17954 Mary Margaret St., Dallas, TX (US) 75287

(*) Notice: Subject to any disclaimer, the term of this patent is extended or adjusted under 35 U.S.C. 154(b) by 0 days.

(21) Appl. No.: 09/893,073

(22) Filed: Jun. 27, 2001

(51) Int. Cl.[7] .................. A47J 37/00; A47J 37/04; A47J 37/07
(52) U.S. Cl. .................. 99/427; 99/419; 99/421 H; 99/448; 126/25 R; 126/9 R
(58) Field of Search .................. 99/339, 340, 357, 99/352, 355, 419–421 V, 444–450, 481, 482; 126/9 R, 41 R, 25 R

(56) References Cited

U.S. PATENT DOCUMENTS

| | | | |
|---|---|---|---|
| 2,161,750 A | * 6/1939 | Schonwald | 99/427 |
| 3,792,654 A | 2/1974 | Turner | |
| 3,901,136 A | * 8/1975 | Wilson et al. | 99/421 P |
| 4,184,420 A | * 1/1980 | Podaras et al. | 99/427 |
| 4,300,523 A | * 11/1981 | Robertson et al. | 126/21 A |
| 4,470,343 A | 9/1984 | Didier | 126/25 R |
| 4,548,130 A | * 10/1985 | Diener et al. | 99/448 X |
| 4,572,062 A | 2/1986 | Widdowson | |
| 4,723,482 A | * 2/1988 | Weiss et al. | 99/443 R |
| 4,867,051 A | 9/1989 | Schalk | |
| 4,984,557 A | * 1/1991 | Konig | 126/21 A |
| 5,158,066 A | * 10/1992 | Dodgen | 126/25 R |
| 5,322,007 A | * 6/1994 | Caridis et al. | 99/476 |
| 5,361,686 A | * 11/1994 | Koopman | 99/446 X |
| 5,431,093 A | * 7/1995 | Dodgen | 99/448 X |
| 5,570,627 A | * 11/1996 | Dahlstrom et al. | 99/427 |
| 5,755,154 A | 5/1998 | Schroeter et al. | |
| 5,761,990 A | 6/1998 | Stewart et al. | |
| 5,782,230 A | 7/1998 | Linnebur et al. | |
| 5,878,739 A | 3/1999 | Guidry | |
| 6,041,695 A | 3/2000 | Kuopus | |

* cited by examiner

*Primary Examiner*—Timothy F. Simone
(74) *Attorney, Agent, or Firm*—John F. Bryan

(57) ABSTRACT

Apparatus for a vendor's cart has hot and cold water storage tanks, a hand-washing sink, a substantially cylindrical oven-housing enclosed by end walls, an access door, and a tubular, vented armature assembly. The armature assembly is mounted between the end walls to rotate about a horizontal axis and a burner extends axially through the end wall to project a flame into the armature interior and force heated gases through armature vents into the oven-housing interior. A plurality of food product receiving baskets mounted on spaced apart horizontal axes rotate relative to the armature assembly, and a shaft extending axially through the opposite oven end wall rotates the armature.

14 Claims, 4 Drawing Sheets

FOOD PREPARATION APPARATUS FOR STREET VENDORS

TECHNICAL FIELD

The present invention relates to the field of reel type ovens and more particularly, to such ovens when integrated into a transportable cart, which may include other basic food cleaning and sanitation equipment.

BACKGROUND OF THE INVENTION

Traditional food service carts operated by street vendors typically include means for cooking various forms of meat or other food products. These products are then sold directly to the public. Since street customers are on-the-move, they are not likely to wait patiently for service, and the vendor wants to satisfy demand as quickly as possible. The operator may expect a rush at certain predictable times during the day, and be able to prepare for these busy periods, but in between, demand is generally unpredictable. Up to a point, a food product may be prepared in batches and kept hot for instant delivery, but it is far more desirable to provide a freshly cooked food product, since anything held too long loses crispness and perceived quality. Also, on a vendor's cart, batch size and/or holding capacity may be relatively limited.

Another, more vexing problem for street vendors has to do with municipal regulations. In most cities, restaurant kitchens are routinely inspected and graded under municipal health department regulations. On the other hand, street vendors have been allowed to operate with relative freedom. Currently however, heightened concern over the distribution of tainted food products and other health considerations are bringing about tighter regulation of street vendors. Some cities have banned street vendors completely to avoid possible health risks. For these reasons, it is desirable to meet the same standards of cleanliness on a vendor's cart as those applied to restaurants. The basic requirements for sanitary food preparation are a clean, crack and crevice free working area, clean hot water at least 170° F., hand washing detergent, a sink and paper towels. If the added capital expense for these amenities could also provide better performance, it would be helpful to the street vendors.

SUMMARY OF THE INVENTION

The present inventions contemplate improved apparatus for street vendor's carts. These inventions relate to or employ some steps and apparatus well known in the oven, cooking and smoking apparatus arts and therefore, not the subject of detailed discussion herein.

A first object of the present invention is therefore, to provide a vendor's cart with the amenities necessary to meet strict sanitary codes. A second object is to provide this vendor's cart with an adequate supply of hot water and preferably, the capability of heating this water and keeping it hot, without access to external power. A third object of the present inventions is to provide a facility for hand washing on the cart. Yet a fourth object is to equip the vendor's cart of the present inventions with cooking apparatus capable of quickly reaching operating temperature, so as to provide hot water and/or freshly cooked food products as needed, without constant oven operation.

An oven that warms-up quickly, on an as-needed basis, may be the best way for a street vendor to cope with irregular sales demand. The circulation of hot gases within the oven interior can shorten the time required for warm-up. Such circulation can also shorten cooking time, even before the oven has fully reached cooking temperature, by exposing a greater portion of the product's surface to cooking temperatures.

The present inventions address the objectives as set forth above by providing apparatus for a vendor's cart that has hot and cold water storage tanks, a hand-washing sink, a substantially cylindrical oven-housing, with end walls enclosing the oven-housing interior, an access door, and a vented tubular armature assembly. The armature assembly is mounted between the oven end walls to rotate about a horizontal axis and a burner extending axially through the end wall projects a flame into the armature tube, forcing heated gases through vents into the oven-housing interior. The burner is supplied by a butane or propane tank, carried on the cart. Although the flame is relatively short in length as compared to the armature, the vents are limited in size, so that hot gases are forced to exit in a substantially uniform manner along the length of the armature. A plurality of food product receiving baskets, mounted on spaced apart horizontal axes, rotate relative to the armature assembly, in the fashion of passenger seats on a Ferris wheel. The water in the hot water storage tank may be heated by a convection heating coil in the oven, or by proximity to the oven. Rotation of the armature may be accomplished manually or may be power driven. In either case, a rotatable shaft extending through the opposite oven end wall is axially connected to the armature.

BRIEF DESCRIPTION OF THE DRAWINGS

The accompanying drawings are incorporated into the specification to assist in explaining the present inventions. The drawings illustrate preferred and alternative examples of how the inventions can be made and used and are not to be construed as limiting the inventions to only those examples illustrated and described. The various advantages and features of the present inventions will be apparent from the drawings in which.

DETAILED DESCRIPTION OF THE DRAWINGS

Figure 1:
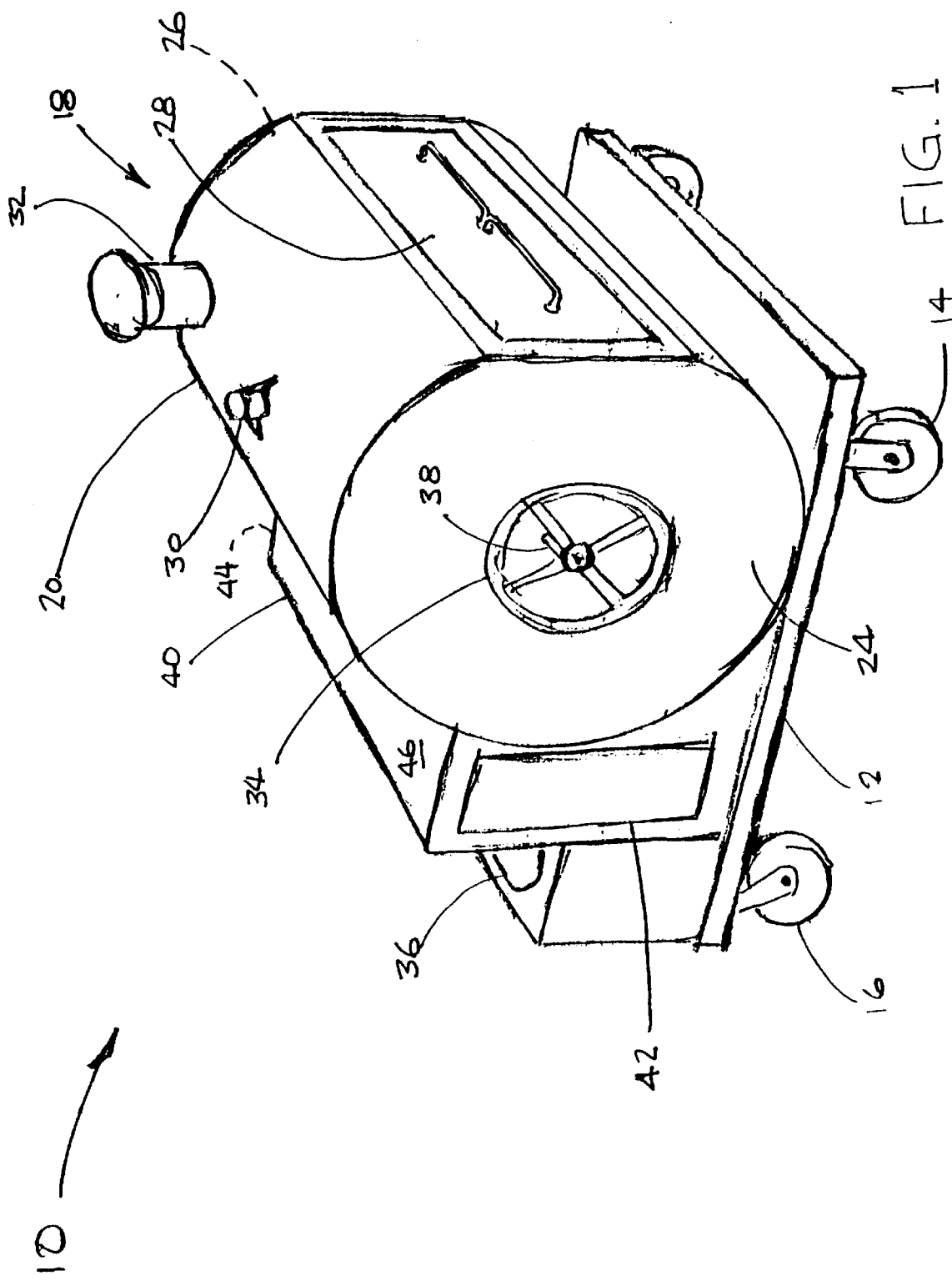
FIG. 1 is a perspective view of a preferred embodiment of the vendor's cart of the present inventions.

The present inventions are described in the following by referring to drawings of examples of how the inventions can be made and used. In these drawings, the same reference characters are used throughout the views to indicate like or corresponding parts. The embodiments shown and described herein are exemplary. Many details are well known in the art, and as such are neither shown nor described.

FIG. 1 is a perspective view of vendor's cart 10, a preferred embodiment of the present inventions. Cart 10 is seen to have a frame 12 supported for rolling movement by rigidly mounted front wheels 14 and castering rear wheels 16. Although a four-wheel cart configuration is shown, it will be readily appreciated by those skilled in the art that four, three or two-wheel configurations are simply a matter of the designer's choice. Oven 18, comprising generally cylindrical oven housing 20, with end walls 24 and 26

(unshown), is mounted on frame 12. Also seen in this view is oven access door 28, which opens downwardly to permit loading and unloading oven 18. Atop oven housing 20 is umbrella stand 30 and heat releasing vent 32. Handwheel 34, the function of which is described below, is mounted on the portion of rotatable shaft 38 that extends outwardly from end wall 24. Mounted at the very rear of frame 12 is handwashing sink 36 and, directly behind oven 18 is enclosure 40. Enclosure 40 is preferably made of stainless steel sheet, with access doors 42 and 44 (unshown) at opposite ends. The upper surface 46 of enclosure 40 provides a flat, seamless, and easily cleaned expanse for food preparation and display or other utility purposes.

Figure 2:
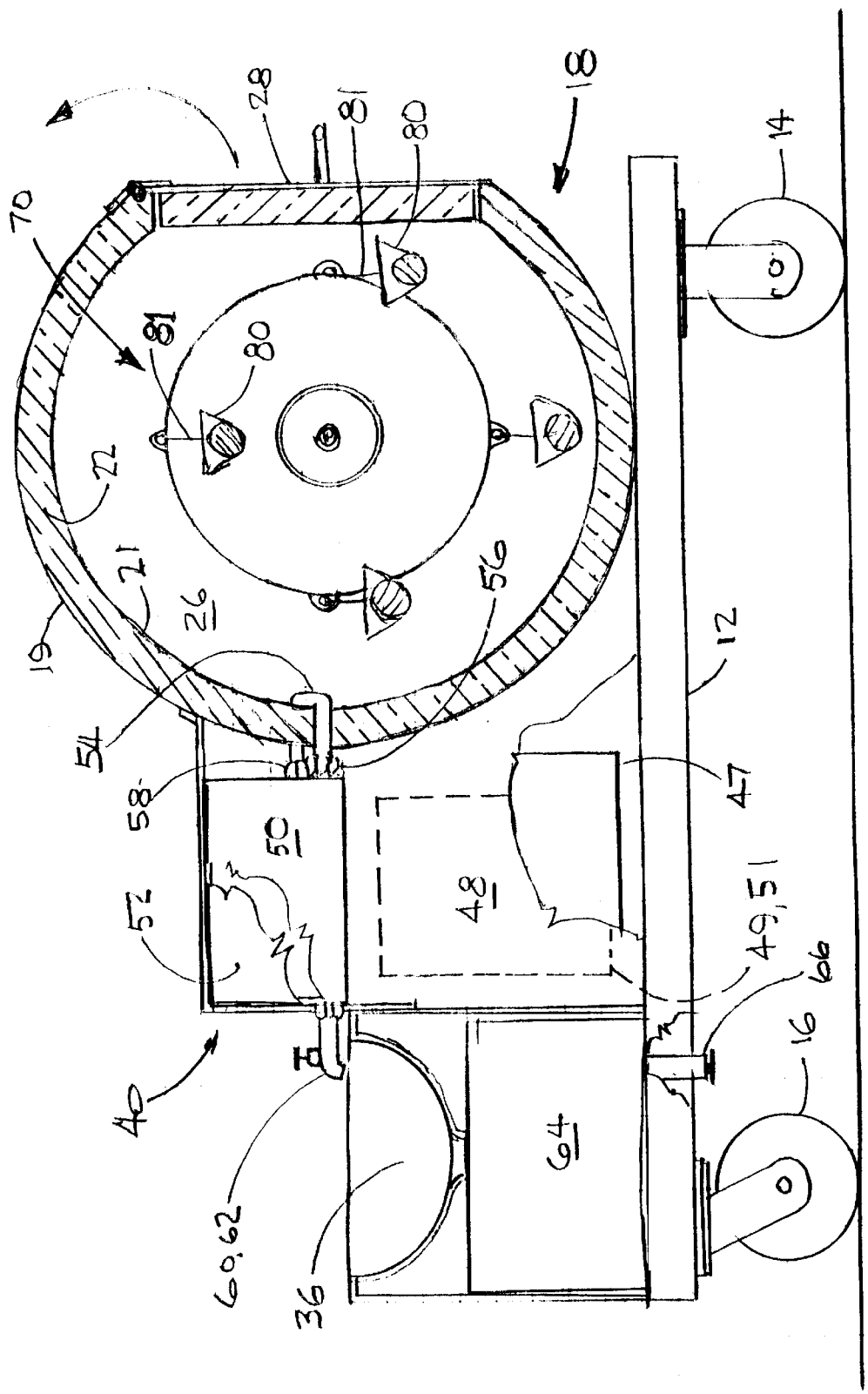
FIG. 2 is a cross-section view of the oven of the preferred embodiment of FIG. 1 as seen along a longitudinal vertical plane.
Figure 3:
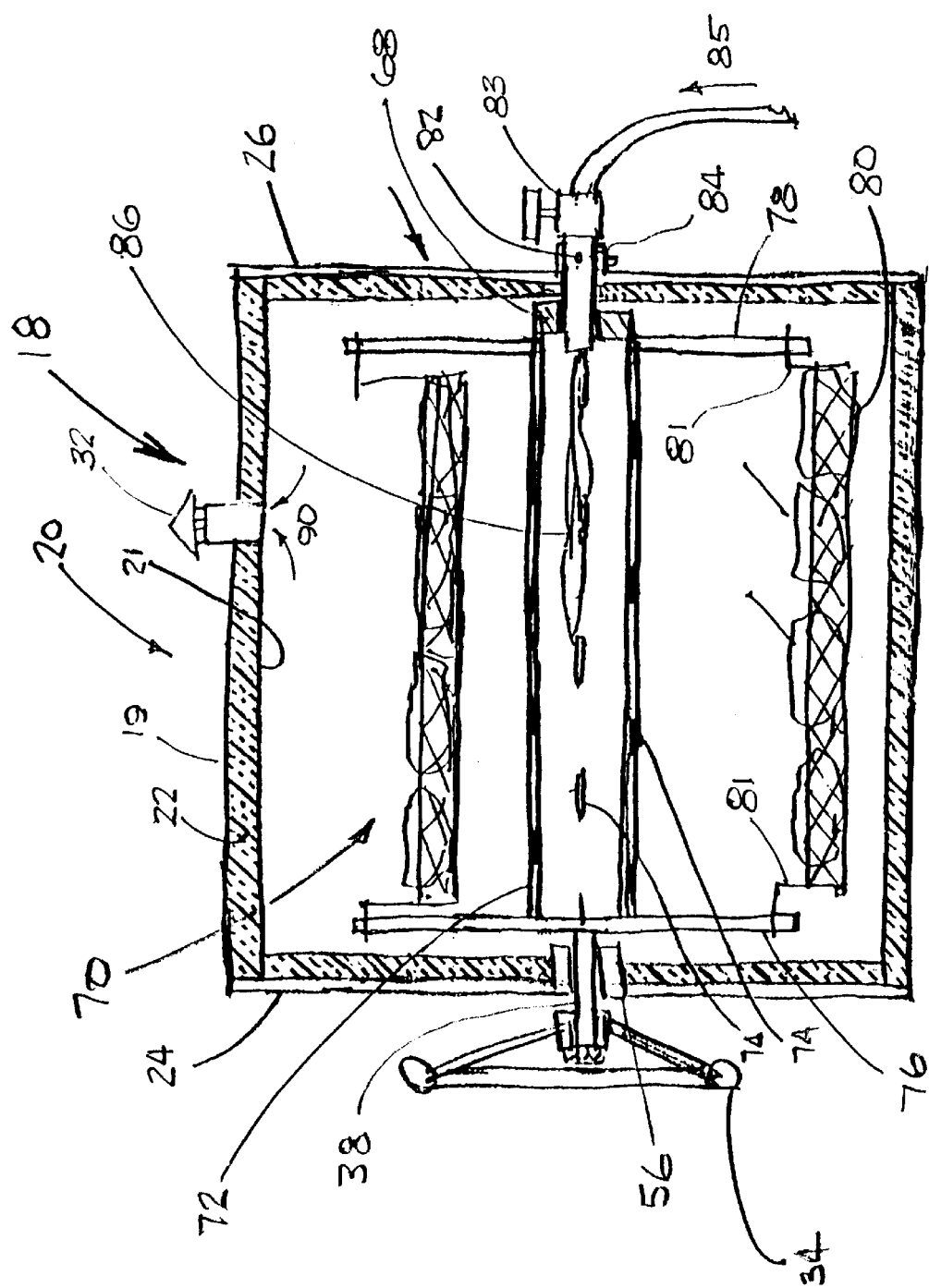
FIG. 3 is a cross-section view of the preferred embodiment of the oven taken at a vertical transverse plane.

We refer now to FIGS. 2 and 3, which show longitudinal and transverse cross-sections of cart 10 and oven 18, as well as other features. Cylindrical oven housing 20 is seen to comprise outer sheet metal cover 19, inner sheet metal lining 21, and insulating core material 22. It should also be noted that end walls 24 and 26 and access door 28 are similarly constructed and insulated. Enclosure 40 is shown to have door 47 for access to interior compartment 48 for food product storage. Should the food product require refrigeration, interior compartment 48 is made large enough to receive an ice chest of adequate dimensions. On the opposite side of cart 10, but unseen in this view, is door 49 for access to separate compartment 51, containing cleaning supplies and a butane or propane tank for the oven. Also in enclosure 40 are cold and hot water tanks 50 and 52 respectively, each having a capacity of approximately 5 gallons. Hot water tank 52 includes a looped heating tube 54, which passes from water heating outlet connection 56 located low in tank 52, through the interior of oven 18 and back to water heating return connection 58, located nearer the top of tank 52. In this manner, water in tank 52 is heated by convection when oven 18 is fired. Water is admitted into sink 36 by gravity flow from cold and hot water tanks 50 and 52, respectively, through normally closed valves 60 and 62. Also shown here is drain tank 64, an 11 gallon receptacle for holding water drained from hand-washing sink 36 after use. This used water is emptied at a suitable location through discharge valve 66.

FIG. 3 shows a cross-section of oven 18 taken at a vertical cutting plane passing along the longitudinal axis of oven 18. Armature assembly 70 is shown to include vented longitudinal tube 72, with apertures 74, and end flanges 76 and 78. Rotatable shaft 38 extends outwardly through end wall 24 to receive handwheel 34 in a fixed, splined or keyed assembly. Rotation of armature assembly 70 may be accomplished by manually turning handwheel 34 or, handwheel 34 may be power driven. Rotatable shaft 38 extends inwardly, through support bushing 56 for a fixed axial connection to armature assembly 70. At the opposite end of armature assembly 70, bearing block 68 is fixed inside of longitudinal tube 72. Burner 82 is inserted through the opposite oven end wall 26, where it is held by clamp 84, and extends into bearing block 68. Thus, burner 82 also acts as a stub axle to support armature assembly 70 for rotation. Burner 82 is controlled by valve 83, regulating gas flow from supply 85 to flame 86. Flame 86 need extend only partially through the length of longitudinal tube 72 inasmuch as apertures 74 are sized to restrict egress of heated gases from flame 86 and distribute these gases uniformly along the length of longitudinal tube 72. Heat release vent 32 allows hot gases to escape, as indicated by arrows 90 so as to promote the circulation of hot gases within the interior of oven 18.

Wire baskets 80 hang from attaching rods 81 to be suspended like Ferris wheel passenger seats, between end flanges 76 and 78. Rotation of armature assembly 70 exposes every side of food products in wire baskets 80 to direct heat from armature apertures 74, as well as radiant heat from longitudinal tube 72 and ambient oven temperature. As a result, it is possible to begin cooking food products in oven 18, even as it is being brought up to operating temperature. The rotation of armature assembly 70 with apertures 82 also helps to set up circulation of the oven gases for distribution of heat uniformly throughout the interior of oven 18 and to bring it to operating temperature more rapidly.

Figure 4:
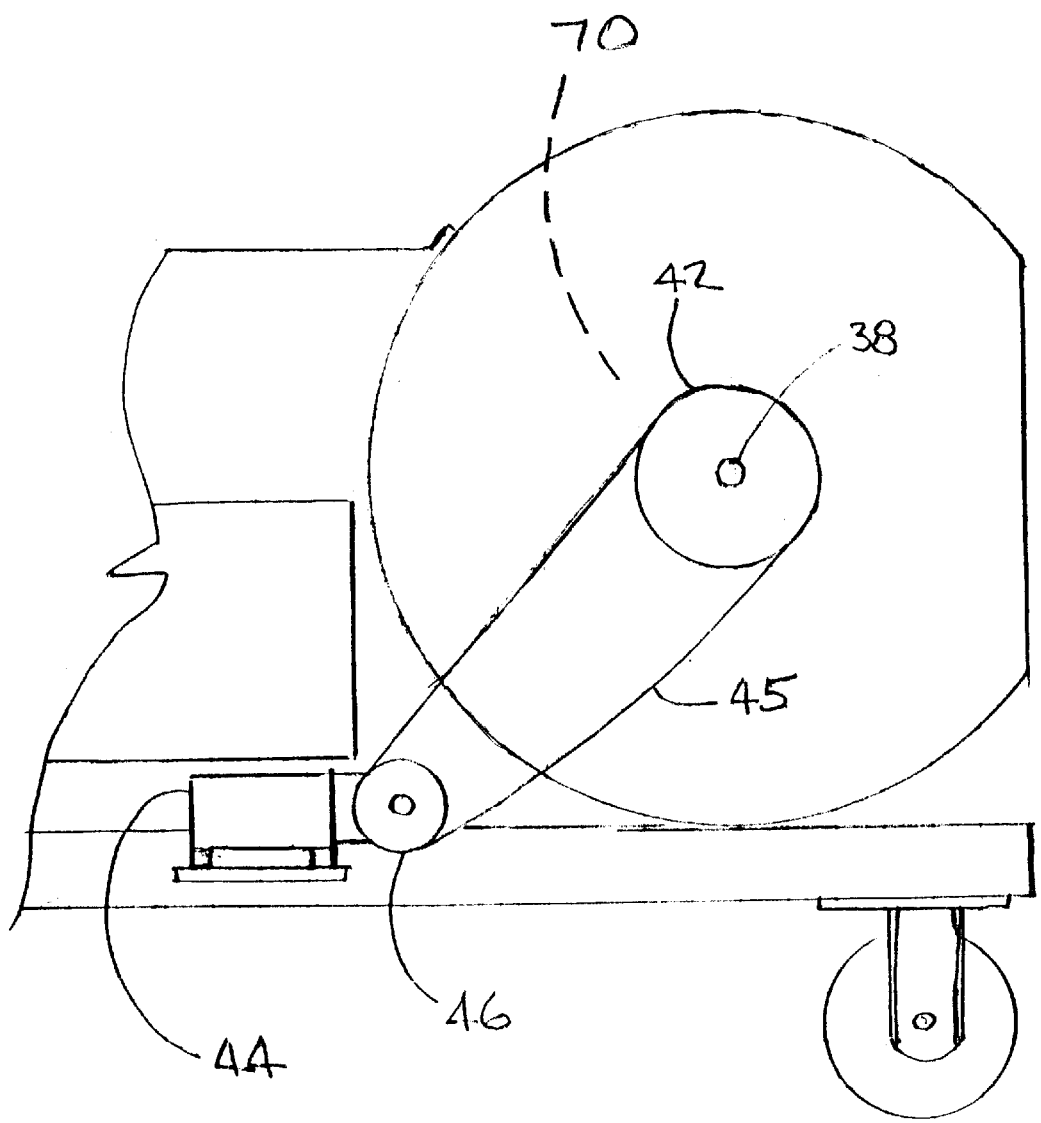
FIG. 4 is a partial view showing apparatus for powered rotation of the armature assembly

FIG. 4 shows an alternative arrangement for driving rotation of rotatable shaft 38. Here, handwheel 34 is replaced by sprocket 42, mounted on rotatable shaft 38 in a splined or keyed connection. 12V D.C. gear motor 44, with output sprocket 46 are connected to sprocket 42 by drive chain 45. An unshown 12V battery and control switch complete the powered drive system for rotation of armature assembly 70. While neither the battery nor the switch are shown herein, these parts are common commercial items well known and understood by those skilled in the oven and mechanical design arts.

As disclosed above, the present inventions provide a vendor's cart capable of being operated and maintained according the same health standards that a municipality would apply to a restaurant kitchen. There is a seamless, crack free and readily cleaned work area and separate compartments to carry food products and cleaning supplies. Water is heated to temperatures in excess of 170° F., so as to be effective for sterile cleaning and can be mixed with cold for hand cleaning or other purposes involving skin contact. There is also space available for ice-chest refrigeration of food supplies, as needed.

The embodiments shown and described above are exemplary. It is not claimed that all of the details, parts, elements, or steps described and shown were invented herein. Even though many characteristics and advantages of the present inventions have been described in the drawings and accompanying text, the description is illustrative only. Changes may be made in the detail, especially in matters of shape, size, and arrangement of the parts within the scope and principles of the inventions. The restrictive description and drawings of the specific examples above do not point out what an infringement of this patent would be, but are to provide at least one explanation of how to use and make the present inventions. The limits of the inventions and the bounds of the patent protection are measured by and defined in the following claims.

We claim:

1. Apparatus for a vendor's cart comprising:
   a frame supported by at least two wheels;
   an oven supported by the frame, the oven having a substantially cylindrical outer shell, with a generally horizontal central axis, an access door and first and second end walls;
   a tubular armature assembly having first and second ends, mounted for rotation about the generally horizontal axis and having apertures in the tubular wall;
   a plurality of food product receiving baskets mounted so as to rotate with the armature assembly, about axes displaced from and parallel to the generally horizontal axis;
   a rotatable shaft connected to the tubular armature assembly at the first end and extending through the first end wall, co-axial with the generally horizontal axis; and
   a burner extending through the second end wall, positioned to project a flame into the tubular armature and force heated gases through the apertures.

2. Apparatus for a vendor's cart according to claim 1 wherein the aperture sizes are selected to uniformly distribute heated gases exiting therethrough.

3. Apparatus for a vendor's cart according to claim 1 wherein the burner is co-axial with the armature assembly to support the second end thereof for rotation about the substantially horizontal axis.

4. Apparatus for a vendor's cart according to claim 1 wherein the rotatable shaft includes a handwheel for manual rotation of the armature assembly.

5. Apparatus for a vendor's cart according to claim 1 wherein the rotatable shaft includes a motor connection for powered rotation of the armature assembly.

6. Apparatus for a vendor's cart according to claim 1 and further comprising;
   a hand-washing sink;
   at least one water storage tank positioned at an elevation higher than the hand-washing sink; and
   a water storage tank interface with the oven for heating storage tank water.

7. Apparatus for a vendor's cart according to claim 6 and further comprising a drain water collecting tank positioned at an elevation lower than the hand-washing sink.

8. Apparatus for a vendor's cart comprising:
   a frame supported by at least two wheels;
   a substantially cylindrical oven supported by the frame and having a generally horizontal central axis, an access door and first and second end walls;
   a vented armature assembly, mounted at the first end wall for rotation within the oven, about the generally horizontal axis;
   a rotatable shaft axially connected to the vented armature assembly and extending through the second end wall along the generally horizontal axis;
   a plurality of food product receiving baskets mounted for rotation with the vented armature assembly;
   a burner extending into the oven to project a flame into the vented armature assembly, so as to force heated gases to circulate through the armature vents and throughout the oven;
   a sink for receiving and holding water; and
   a water storage tank mounted at a higher level than the sink and including a heat exchanging interface with the oven.

9. Apparatus for a vendor's cart according to claim 8 wherein the vents of the vented armature assembly are apertures sized to uniformly distribute heated gases exiting from the vented armature.

10. Apparatus for a vendor's cart according to claim 8 wherein the burner supports the armature assembly at one end for rotation about the generally horizontal axis.

11. Apparatus for a vendor's cart according to claim 8 wherein the rotatable shaft includes a handwheel for manual rotation of the armature assembly.

12. Apparatus for a vendor's cart according to claim 8 wherein the rotatable shaft includes a motor connection for powered rotation of the armature assembly.

13. Apparatus for a vendor's cart according to claim 8 and further comprising;
    a hand-washing sink;
    at least one water storage tank positioned at an elevation higher than the hand-washing sink; and
    a water storage tank interface with the oven for heating storage tank water.

14. Apparatus for a vendor's cart according to claim 13 and further comprising a drain water collecting tank positioned at an elevation lower than the hand-washing sink.

* * * * *